(12) United States Patent
Frei et al.

(10) Patent No.: US 9,938,707 B2
(45) Date of Patent: Apr. 10, 2018

(54) MOUNTING PLATE FOR A LAVATORY BODY

(71) Applicant: Presano AG, Diepoldsau (CH)

(72) Inventors: Christian Frei, Oberriet (CH); Daniel Graber, Oberriet (CH); Marcel Tremp, Speicher (CH)

(73) Assignee: Presano AG, Diepoldsau (CH)

( * ) Notice: Subject to any disclaimer, the term of this patent is extended or adjusted under 35 U.S.C. 154(b) by 0 days.

(21) Appl. No.: 15/024,534

(22) PCT Filed: Sep. 30, 2013

(86) PCT No.: PCT/CH2013/000174
§ 371 (c)(1),
(2) Date: Mar. 24, 2016

(87) PCT Pub. No.: WO2015/042726
PCT Pub. Date: Apr. 2, 2015

(65) Prior Publication Data
US 2016/0237670 A1 Aug. 18, 2016

(51) Int. Cl.
*A47K 3/20* (2006.01)
*E03D 11/14* (2006.01)
(Continued)

(52) U.S. Cl.
CPC ............ *E03D 11/143* (2013.01); *A47K 3/281* (2013.01); *E03D 1/26* (2013.01); *E03D 9/08* (2013.01);
(Continued)

(58) Field of Classification Search
CPC ........................................................ E03D 9/08
(Continued)

(56) References Cited

U.S. PATENT DOCUMENTS

| 5,724,773 A | 3/1998 | Hall | |
|---|---|---|---|
| 2013/0232679 A1* | 9/2013 | Graber | E03D 9/08 4/417 |

FOREIGN PATENT DOCUMENTS

| CN | 202426438 U | 9/2012 |
|---|---|---|
| DE | 9410205 U | 9/1994 |

(Continued)

*Primary Examiner* — Lori Baker
(74) *Attorney, Agent, or Firm* — Rankin, Hill & Clark LLP (57) ABSTRACT

Mounting plate (1) for a lavatory body (2) of a washlet, comprising: a building-side installation surface (3); a front installation surface (4) for connecting to a lavatory body (2); at least one opening (23, 24) for leading through a flushing water supply and an outflow; means (29) for fastening the mounting plate (1) to a building wall; a first and a second supporting element (8, 9) which are designed as plug elements for pluggable mounting of a lavatory body (2) onto the mounting plate (1); an electrical plug connector (46) arranged on the front installation surface (4); and a water supply connection piece (43). Lavatory body (2) for pluggable mounting onto a mounting plate (1), comprising two or more horizontally spaced-apart guide elements (15) which are fastened in the cavity (14) to the ceramic body (20) and are designed for pluggable connection to supporting elements (8, 9) on a mounting plate (1); and a bidet device (30) with an electric connection (31) which is fixedly arranged on the lavatory body (2) and is designed as a plug connector accessible from the rear side (13) of the ceramic body (20).

19 Claims, 4 Drawing Sheets

(51) Int. Cl.
  *E03D 11/02* (2006.01)
  *E03D 11/13* (2006.01)
  *E03D 1/26* (2006.01)
  *A47K 3/28* (2006.01)
  *E03D 9/08* (2006.01)
  *F16B 21/18* (2006.01)

(52) U.S. Cl.
  CPC .............. *E03D 11/02* (2013.01); *E03D 11/13* (2013.01); *E03D 11/14* (2013.01); *F16B 21/18* (2013.01); *F16B 21/183* (2013.01)

(58) Field of Classification Search
  USPC .................................................. 4/420.5, 420
  See application file for complete search history.

(56) References Cited

FOREIGN PATENT DOCUMENTS

| | | |
|---|---|---|
| DE | 29605731 U1 | 5/1996 |
| EP | 1317586 B1 | 2/2007 |
| EP | 2450492 A1 | 5/2012 |
| FR | 2228905 A1 | 12/1974 |
| JP | 2013096215 A | 5/2013 |

\* cited by examiner

MOUNTING PLATE FOR A LAVATORY BODY

The invention relates to a mounting plate for a lavatory body, to a lavatory body which is suitable for mounting on the mounting plate, to a sanitary appliance, to a method for mounting the sanitary appliance, and to a method for removing a lavatory body from the mounting plate.

A shower toilet is known from EP-A 1 317 586 GEBERIT in which the functional elements, such as for example the bidet and a heater, are mounted in a cavity in the lavatory body. Electronic control elements for controlling the functional elements are likewise mounted on the lavatory body. The flushing water supply and outflow pipes fastened to a building-side supporting structure and the fastening elements for the lavatory body form a defined interface at which the shower toilet is mounted. The additional water and power connections necessary for the shower toilet are provided at pre-defined positions for the connection. However, during the mounting of the lavatory body there is a risk that the water and power lines are crushed or trapped, or there is a disadvantage that the connection of the water and power lines to the functional elements integrated in the lavatory body is very awkward or is associated with risks.

A plate-shaped supporting element for a lavatory body is known from US-A 2008/141444 LIN. This plate-like supporting element comprises two fastening elements for fastening of the ceramic body, a first hole for a flushing water supply line and a second hole for the outflow pipe. Furthermore, a further water supply line and an electrical cable for a bidet are passed through the first hole. The electrical cable for the bidet is connected to a power socket attached to the building wall. Furthermore, a valve for the flushing water supply is attached to the plate-like supporting element. It is likewise a disadvantage of this known mounting plate that when the lavatory body is attached to the mounting plate, there is a risk that the water and power lines are crushed or trapped.

The invention seeks to create a remedy here. The object of the invention is to provide mounting means which enable simpler and faster mounting or demounting of a sanitary appliance, in particular a shower toilet, to a building wall without the need for special mounting openings on the ceramic body for access to the fastening elements and lines.

The invention achieves the stated object with a mounting plate for a lavatory body, a lavatory body, a sanitary appliance, a method for mounting the sanitary appliance, and a method for removing a lavatory body from the mounting plate, all as claimed herein.

The advantages achieved by the invention are essentially that by virtue of the mounting plate according to the invention:
- a simple mounting, or alignment and screwing of the mounting plate, for example to a building-side supporting structure, is enabled, for example by means of threaded rods. The handy mounting plate has only a low weight and offers good accessibility;
- a simple connection of the water and power connections to the mounting plate can be achieved, i.e., all connections are easily accessible from the front, there is sufficient space and the working area can be easily inspected;
- there is sufficient space on the mounting plate for neat stowage of excess lengths of the lines. Thus, space is provided for the water and power lines, so that they can be neatly laid; for example, pre-defined housings in which excess lengths of lines can be coiled can be provided on or in the mounting plate;
- a simple and fast mounting of the actual shower toilet (lavatory body) is enabled merely by movement thereof onto the mounting plate;
- locking means which can be latched automatically can be attached to the mounting plate, so that the lavatory body can be mounted on or demounted from the mounting plate without tools, so that:
    - for servicing, the lavatory body including the bidet device can be easily removed from the mounting plate and can be repaired or replaced;
    - no special openings are necessary on the lavatory body in order to offer access to fastening elements, so that the shower toilet also has a more aesthetic appearance;
    - the water and power lines remain unaffected, still neatly positioned and protected, so that there is no risk of damage to the lines;
- there is no risk of trapping or crushing the lines; and
- no technical specialist is necessary for the mounting, which is especially advantageous during servicing.

Further advantageous embodiments of the invention may be commented upon as follows:

In a special embodiment of the mounting plate, the first and second supporting elements comprise locking means for snap-in engagement in guide elements on a lavatory body. Thus, the advantage can be achieved that during the mounting, the lavatory body can be easily pushed against the mounting plate until the locking means arranged on the supporting elements engage in the guide elements on the lavatory body, so that the lavatory body is fastened on the mounting plate by the supporting and guide elements and is secured by the locking means.

In a further embodiment, the mounting plate comprises a control element, preferably a solenoid valve, which together with the water supply connection piece forms a water supply which can be shut off for a bidet device. The water supply connection piece is preferably arranged on the front installation surface of the mounting plate. Thus, the advantage can be achieved that the building-side water supply line for the bidet can be fixedly connected to the inlet opening of the solenoid valve. When the bidet device is used, the solenoid valve can be opened by an operating element attached, for example, to the lavatory body, so that the bidet device is supplied with water.

In another embodiment, an electrical main switch is arranged on the mounting plate, which is suitable for switching on and off of an electrical interface comprising the electrical plug connector. Thus, the appliance can be completely uncoupled from the power supply system for servicing purposes. In this way a safe demounting of the appliance is possible.

In another embodiment of the mounting plate, an electrical interface encompassing the electrical plug connector comprises a mains voltage supply to a shower toilet and preferably an interface for transmission of a control signal for a solenoid valve arranged on mounting plate, and a data interface for data communication with a shower toilet. Further control signals can also be provided for further devices, for example the flush release for the water flushing. The data interface may be embodied, for example, as a USB, RS232 or Ethernet interface. This enables for example an update of the software, a diagnosis and/or readout of stored data etc., primarily by a service engineer. The electrical interface preferably comprises at least one connection point for an electrical signal transmission, the connection point preferably comprising at least one control line for the control element. A solenoid valve can be arranged as a control element on the mounting plate.

In yet another embodiment of the mounting plate, the locking means comprise a spring element, so that guide elements arranged on a lavatory body can be brought into snap-in engagement with the supporting elements. Alternatively, the locking means can comprise holding elements with which spring elements of first and second guide elements of a lavatory body can be brought into snap-in engagement. Thus, the advantage is achieved that the locking means arranged on the supporting elements can engage in the guide elements, so that no further securing elements are necessary for fastening the lavatory body to the mounting plate.

In a further embodiment of the mounting plate, the spring elements are formed as spring cotter pins, of which each spring cotter pin can be mounted on and demounted from a supporting element in a plane substantially parallel to the front installation surface.

In a further embodiment of the mounting plate, the spring elements formed as spring cotter pins comprise two arms which are arranged adjacent to one another in a plane parallel to the front installation surface and which can be forced apart elastically, so that they can be brought into snap-in engagement with holding elements which are arranged on the guide elements of a lavatory body. It is an advantage of this embodiment that the lavatory body can be pushed, perpendicular to the front installation surface, towards the mounting plate until the spring elements arranged on the supporting elements snap into the holding elements on the guide elements of the lavatory body.

The mounting plate preferably comprises a respective opening for the flushing water supply and for the outflow. Furthermore, the mounting plate preferably comprises a connection for an electronic signal transmission which is preferably designed for a pluggable connection, perpendicular to the front installation surface, to a complementary connection for electronic signal transmission.

In a further embodiment, the mounting plate comprises a seal arranged on its periphery. As a result, the advantage can be achieved that even if the building wall is uneven, the bidet device arranged in the lavatory body can be completely sealed against the outside.

In another embodiment, the mounting plate has a maximum thickness of 70 mm, and preferably a maximum thickness of 50 mm. Typically, the thickness of the mounting plate is approximately 40-50 mm. The front installation surface of the mounting plate preferably has a maximum area of 140,000 mm$^2$, preferably 90,000 mm$^2$.

In a special embodiment of the lavatory body, the guide elements comprise holding elements for a snap-in connection to supporting elements on a mounting plate. The holding elements preferably comprise grooves with which spring elements of first and second supporting elements of a mounting plate can be brought into snap-in engagement. Alternatively, the holding elements can each comprise a spring element, so that supporting elements arranged on a mounting plate can be brought into snap-in engagement with the guide elements. The supporting elements here each comprise a groove with a first side surface directed towards the front installation surface and a second side surface directed away from the front installation surface. In this case the first side surfaces of the grooves directed towards the front installation surface form a shoulder surface which prevents the spring elements arranged on the lavatory body from coming unlatched in a direction perpendicular to the front installation surface. Thus, the lavatory body can be fastened on the mounting plate by engagement of the spring elements, but cannot be removed by pulling away from the mounting plate.

In another embodiment, the lavatory body comprises a connection for an electronic signal transmission which is designed for a pluggable connection, perpendicular to the rear side of the ceramic body, to a complementary connection for electronic signal transmission.

In a further embodiment of the lavatory body, the cavity in the ceramic body is designed for accommodating technical elements of a bidet device. The ceramic body preferably comprises on its rear side a ceramic rim which delimits the cavity peripherally and surrounds a surface which is larger than the mounting plate according to the invention. When the lavatory body is mounted on the mounting plate the ceramic rim preferably covers the mounting plate completely. The ratio $F_{ceramic} : F_{mounting\ plate}$ between the surface $F_{ceramic}$ surrounded by the ceramic rim and the surface area of the building-side and/or the front installation surface $F_{mounting\ plate}$ is preferably a maximum of 0.95, preferably a maximum of 0.8.

In another embodiment of the lavatory body, the bidet device comprises a container with a container opening which is open towards the upper surface of the lavatory body, so that the container can be filled with water by a water supply arranged on a mounting plate. The bidet device is preferably arranged in the cavity of the lavatory body.

In a special embodiment of the sanitary appliance, when the lavatory body is mounted on the mounting plate a spacing remains between the ceramic body and a building wall, and a seal or sealing material is inserted into an intermediate space, formed by the spacing, between the ceramic body and a building wall. Thus, a neat connection to the wall is achieved and noises caused by the shower toilet technology (bidet) are suppressed. The spacing is preferably at least 3 mm, preferably at least 5 mm, and at most 15 mm, preferably at most 8 mm.

The mounting plate is preferably used for fastening a lavatory body, in particular of a shower toilet, on a building wall.

The invention and refinements of the invention are explained in greater detail below with reference to the partially schematic illustrations of one exemplary embodiment.

Figure 1:
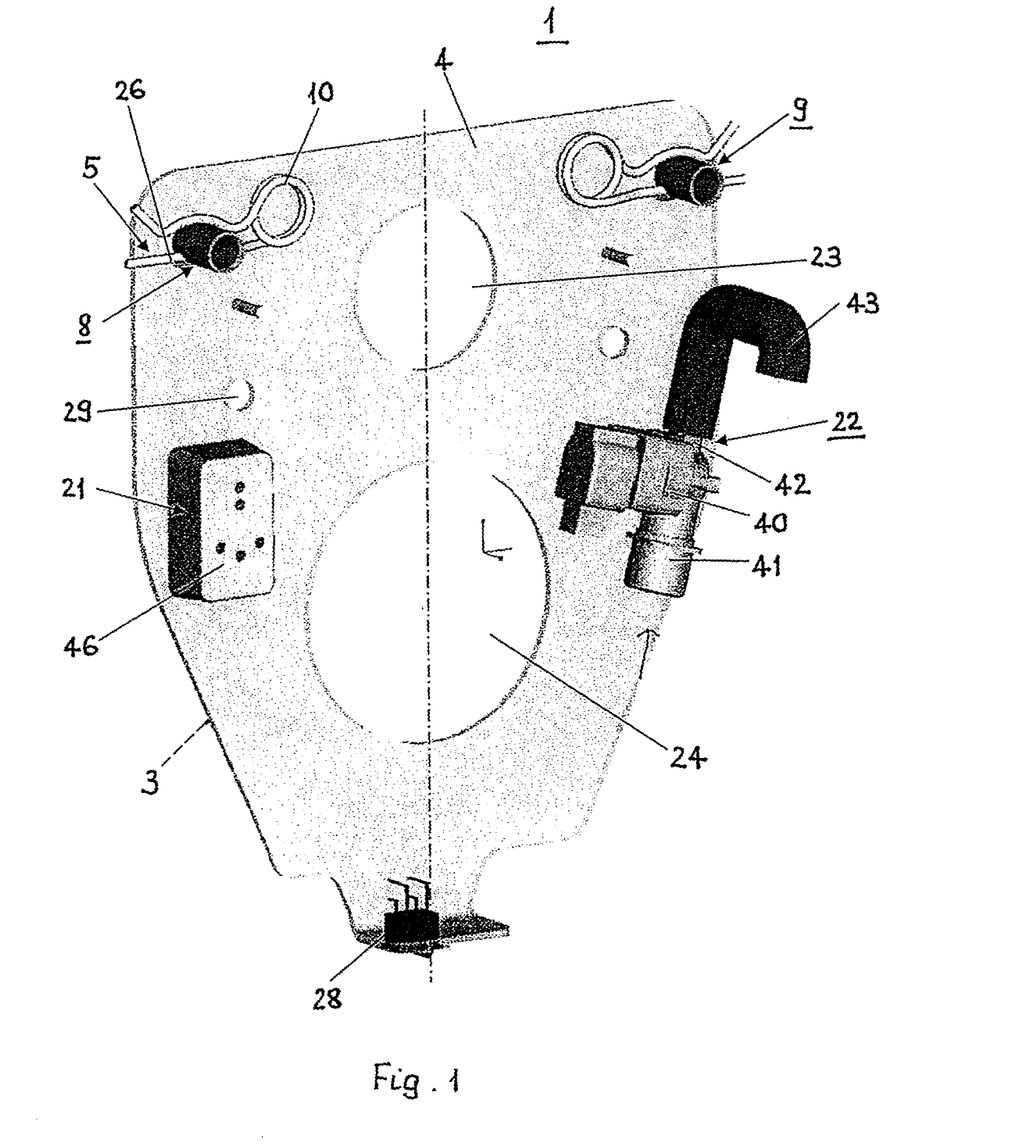
FIG. 1 shows a perspective view of an embodiment of the mounting plate according to the invention from the front side.

An embodiment of the mounting plate 1 according to the invention is illustrated by way of example in FIG. 1. The mounting plate 1 is designed for fastening a lavatory body 2 of a shower toilet, and comprises a building-side installation surface 3, a front installation surface 4 for connection to the lavatory body 2 (FIG. 2) and an opening 23, 24 for leading through a flushing water supply and an outflow, respectively. Means 29 for fastening the mounting plate 1 to a building wall or to a building-side supporting or mounting structure are arranged on the mounting plate 1. The means 29 for fastening the mounting plate 1 are configured as drilled holes in the mounting plate 1, so that for example threaded rods, which are fastened to the building-side supporting or mounting structure, can be passed through these drilled holes, and the mounting plate 1 can be fastened to the building-side supporting or mounting structure by means of nuts which can be screwed onto these threaded rods. Furthermore, the mounting plate 1 comprises a first and a second supporting element 8, 9 which are arranged respectively on a left and a right side of the front installation surface 4 and which are formed as plug elements for pluggable mounting of the lavatory body 2 (FIG. 2) on the mounting plate 1. Moreover, an electrical interface 21 and a water supply 22 which is suitable for supplying water to a container 32 (FIG. 2) situated in the lavatory body 2 is arranged on the front installation surface 4 of the mounting plate 1. The mounting plate 1 can have a thickness of typically approximately 40-50 mm.

In the embodiment of the mounting plate 1 illustrated here, the water supply 22 for the bidet device 30 arranged in the lavatory body 2 comprises a control element which may be formed as a solenoid valve 40. Furthermore, the water supply 22 comprises a water supply connection piece 43 which is formed as a pipe bend and is arranged on the discharge opening 42 of the solenoid valve 40 in such a way that the pipe bend is directed substantially vertically, away from the front installation surface 4, and the opening of the pipe bend is directed towards the lower side of the mounting plate 1. Thus, when the lavatory body is mounted on the mounting plate 1 the water supply connection piece 43 of the water supply 22 can be pushed into the cavity 14 (FIG. 2), which is open on the rear side 13 of the lavatory body 2, until the opening of the pipe bend comes to rest above a container opening 33 of the container 32 which is open towards the upper side of the lavatory body 2, so that the container 32 can be supplied with water by the water supply 22. Thus, when the mounting plate 2 is mounted, a building-side water pipe can be fixedly connected to the inlet opening 41 of the solenoid valve 40 by means of a tube or hose piece. During the later mounting of the lavatory body 2 on the mounting plate 1, no pipe or hose connection then has to be made for the water supply to the bidet device 30. The lavatory body 2 can simply be pushed towards the mounting plate 1, substantially perpendicular to the front installation surface 4.

Figure 2:
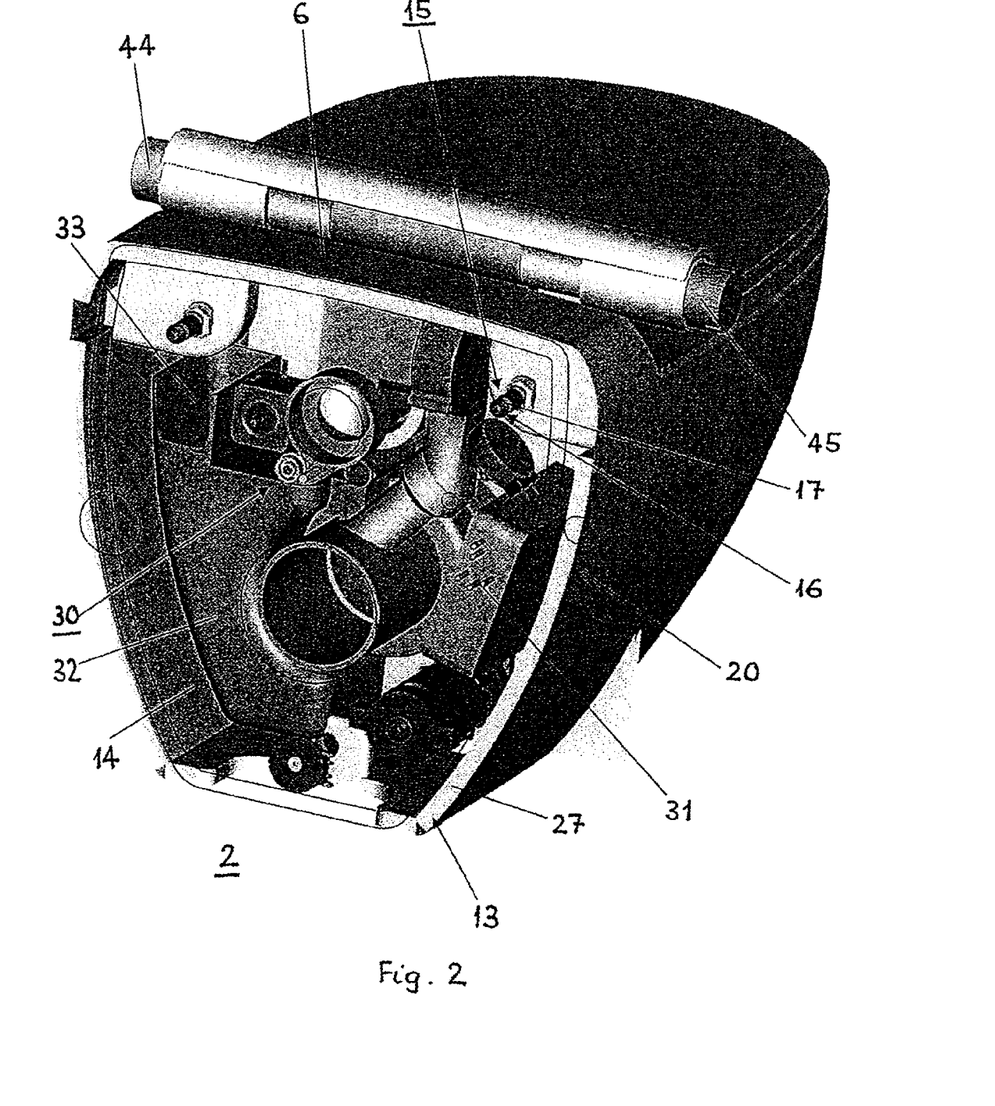
FIG. 2 shows a perspective view of an embodiment of the lavatory body according to the invention from the rear side.

The electrical interface 21 comprises an electrical connection which is formed as an electrical plug connector 46 and preferably as a power socket. Alternatively, the electrical connection can also be designed as an electrical connector. Because the electrical plug connector can be connected to a complementary plug connector on the lavatory body 2, perpendicular to the front installation surface 4, it is ensured that when mounted on the mounting plate 1, the lavatory body 2 can be pushed from the front, i.e., substantially perpendicular to the front installation surface 4, towards the mounting plate 1. The electrical interface 21 can comprise a connection point for an electrical signal transmission, for example control lines (not shown) for the control element, for example in the form of a solenoid valve 40, for the water supply 22. Thus, the control signals for the control element of the water supply 22 can be triggered by a first operating element 44 on the lavatory body 2 (FIG. 2). Furthermore, the mounting plate 1 can comprise a connection 28 for an electronic signal transmission which is preferably likewise designed for a pluggable connection, perpendicular to the front installation surface 4, to a complementary connection on the lavatory body 2 (not shown) for electronic signal transmission, so that, for example, control signals can be transmitted from a second operating element 45 (FIG. 2) arranged on the lavatory body 2 to a water flush system.

The first and second supporting elements 8, 9 can each comprise a sleeve which is fastened to the mounting plate 1 and of which the holes are arranged perpendicular to the front installation surface 4, so that guide elements 15 (FIG. 2) which are arranged on the lavatory body 2 and which can be formed as bolts can be pushed into the holes in the first and second supporting elements 8, 9 when the lavatory body 2 is mounted on the mounting plate 1. Moreover, the first and second supporting elements 8, 9 comprise locking means 5 for snap-in engagement in the guide elements 15 on the lavatory body 2. The locking means 5 comprise spring elements 10 which are designed and arranged for snap-in engagement in the holding elements 16 arranged on the guide elements 15 of the lavatory body 2. The supporting elements 8, 9 on the mounting plate 1 and the guide elements 15 on the lavatory body 2 are designed as rigid components and serve to hold the lavatory body 2 on the mounting plate 1, wherein the lavatory body 2 mounted on the mounting plate 1 is secured in its position by the locking means 5 engaging in the holding elements 16.

The spring elements 10 are designed as spring cotter pins, of which each spring cotter pin can be mounted on or demounted from a supporting element 8, 9 in a plane substantially parallel to the front installation surface 4. In this case the spring elements 10 comprise two arms 26 which are arranged adjacent to one another in a plane substantially parallel to the front installation surface 4 and which can be forced apart elastically, so that they can be brought into snap-in engagement with holding elements 16 which are arranged on the guide elements 15 of the lavatory body 2 (FIG. 2). Thus, the lavatory body 2 can be pushed towards the mounting plate 1, perpendicular to the front installation surface, until the spring elements 10 arranged on the supporting elements 8, 9 snap into the holding elements 16 on the guide elements 15 of the lavatory body 2. For demounting of the lavatory body 2, the spring elements 10 can be easily turned from the underside of the lavatory body 2 by means of a cord or a wire fastened to the spring element 10 until they disengage from the holding elements 16 and release the guide elements 15. When the cord is released, the spring elements 10 spring back and the lavatory body 2 can be secured again later.

Figure 3:
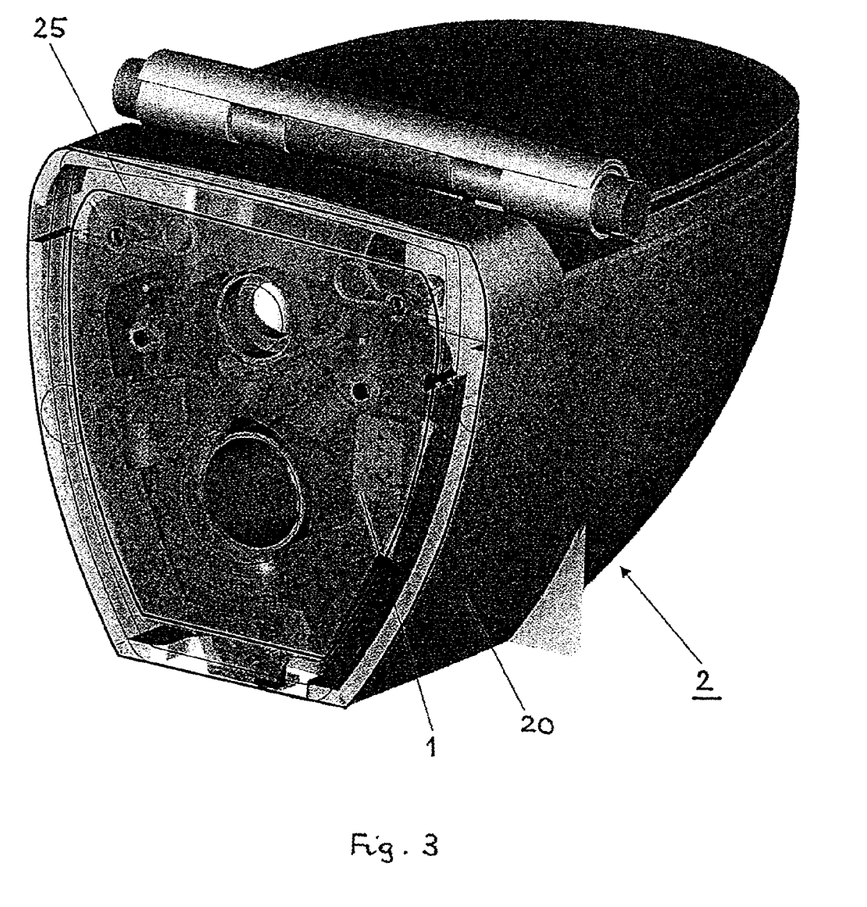
FIG. 3 shows a perspective view, from the rear side, of the lavatory body mounted on the mounting plate, the mounting plate being represented as transparent.

FIGS. 2 and 3 show an embodiment of the lavatory body 2 according to the invention for pluggable mounting on a mounting plate 1 according to FIG. 1. The lavatory body 2 comprises a ceramic body 20 with a building-side rear side 13 and a cavity 14 which is open on the rear side 13. In the cavity 14, two horizontally spaced apart guide elements 15 are fastened to the ceramic body 20 and are designed for pluggable connection to the supporting elements 8, 9 on the mounting plate 1. At the same time, the guide elements 15 form the supporting elements of the lavatory body 2. Furthermore, the lavatory body 2 comprises a bidet device 30 with an electrical connection 31 which is designed as an electrical plug connector which is accessible from the rear side 13 of the ceramic body 20. The electrical connection 31 is preferably designed as an electrical connector which is complementary to the power socket on the mounting plate 1, but alternatively can also be designed as a power socket.

The bidet device 30 comprises a container 21 having a container opening 33 which is open towards the top, so that as described above, when the lavatory body 2 is mounted on the mounting plate 1 the water supply connection piece 32 of the water supply 22 can be pushed into the cavity 14 which is open on the rear side 13 of the lavatory body 2 until the opening of the pipe bend comes to rest above the container opening 33 of the container 32, so that the container 32 can be supplied with water by the water supply 22.

The guide elements 15 are designed as bolts and comprise holding elements 16 for a snap-in connection to the supporting elements 8, 9 on the mounting plate 1. The spring elements 10 on the first and second supporting elements 8, 9 of the mounting plate 1 can be brought into snap-in engagement with the holding elements 16. The holding elements 16 are formed as grooves 17 with a first side face directed towards the rear side 13 of the lavatory body 2 and a second side face directed away from the rear side 13. In this case the second side surfaces of the grooves 17 directed away from the rear side 13 of the lavatory body 2 form a shoulder surface, which prevents the spring elements 10 arranged on the mounting plate 1 from coming unlatched in a direction perpendicular to the rear side 13. When the lavatory body 2 is mounted on the mounting plate 1, the lavatory body 2 is pushed towards the mounting plate 1 until each of the arms 26 of the spring elements 10 arranged on the supporting elements 8, 9 snaps into one of the grooves 17 on the guide elements 15 of the lavatory body 2.

Alternatively, the supporting elements 8, 9 on the mounting plate 1 and the guide elements 15 on the lavatory body 2 can be interchanged, so that the supporting elements 8, 9 are designed as bolts and the guide elements 15 are designed as sleeves as described above. In this case, the holding elements 16 on the guide elements 15 of the lavatory body 2 and the locking means 5 on the supporting elements 8, 9 of the mounting plate 1 may likewise be interchanged, so that the holding elements 16 on the guide elements 15 of the lavatory body 2 each comprise a spring element 10 as described above, whereas the locking means 5 on the supporting elements 8, 9 of the mounting plate 1 can then be formed as grooves 17.

On its rear side 13 the ceramic body 20 comprises a ceramic rim 27 (FIG. 2) which delimits the cavity 14 peripherally and surrounds a surface which is larger than the mounting plate 1. When the lavatory body 2 is mounted on the mounting plate 1, a spacing preferably remains between the ceramic body 20 and a building wall, and a seal 25 (FIG. 3) or sealing material is inserted into the intermediate space between the ceramic body 20 and the building wall formed by the spacing.

For mounting of a sanitary appliance which comprises a mounting plate 1 according to the invention and a lavatory body 2 according to the invention, the following steps are carried out: a) fastening the mounting plate 1 on the building wall; b) connecting the electrical interface 21 and the water supply 22 to corresponding building-side connections; c) fastening of the lavatory body 2 on the mounting plate 1 by pushing the guide elements 15 into the first and second supporting elements 8, 9 until the spring elements 10 snap into the grooves 17; and d) attaching a seal 25 or a sealing material in an intermediate space formed between the ceramic body 20 and a building wall.

The lavatory body 2 can then be removed again from the mounting plate 1, the following steps being carried out for this purpose: e) turning the spring elements 10 until the supporting elements 8, 9 or guide elements 15 are freed by means of a cord or a wire; and f) pulling the lavatory body 2 away from the mounting plate 1 in a direction perpendicular to the front installation surface 4 of the mounting plate 1 When the cord or the wire is released, the spring elements 10 spring back and the lavatory body 2 can be engaged again later.

Figure 4:
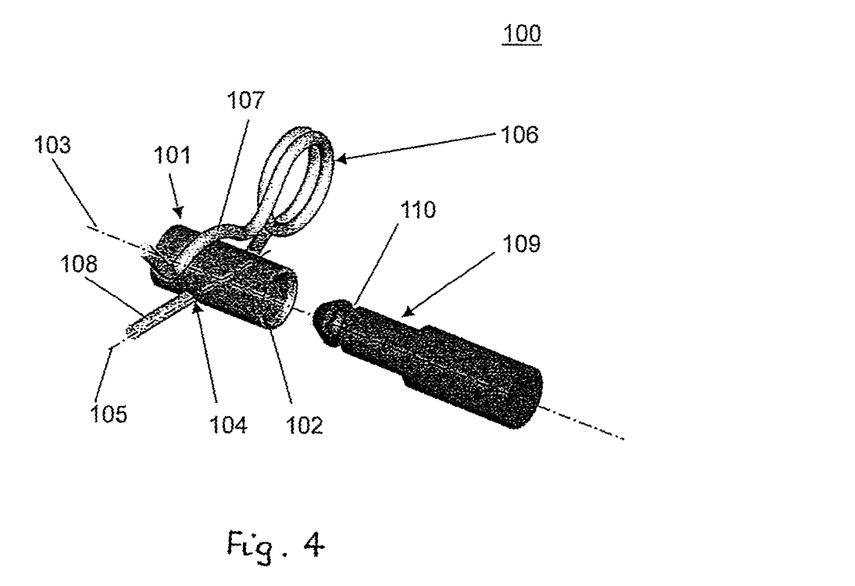
FIG. 4 shows an embodiment of a quick-acting closure which is suitable, for example, for a releasable pluggable fastening of the lavatory body according to the invention on the mounting plate according to the invention.

FIG. 4 shows a quick-acting closure 100 with a detent spring which is suitable, for example, for a releasable pluggable fastening of the lavatory body 2 according to the invention on the mounting plate 1 according to the invention.

The quick-acting closure 100 essentially comprises:
A) a tubular receptacle 101 which is or can be fastened to a first component, e.g. to the mounting plate 1, with a casing 102, a longitudinal axis 103 and a slot 104 which penetrates the casing 102 and has a slot axis 105 oriented obliquely with respect to the longitudinal axis 103 of the tubular receptacle 101;
B) a detent spring 106 with a first arcuate curved arm 107 and a second straight arm 108, wherein the first arm 107 is guided externally around a part of the casing 102 of the tubular receptacle 101 and the second arm 108 is led through the slot 104 in the tubular receptacle 101; and
C) a bolt 109 which is or can be fastened to a second component, for example to the lavatory body 2, can be pushed into the tubular receptacle 101 and has a groove 110 running at least partially around the periphery, wherein the second straight arm 108 of the detent spring 106 can be brought into snap-in engagement with said groove.

By turning the detent spring 106 by approximately 35° in a plane perpendicular to the longitudinal axis 103 of the tubular receptacle 101, the locking of the bolt 109 in the tubular receptacle 101 is freed. If the rotation angle is limited to a maximum of approximately 60°, the detent spring 106 springs back autonomously into its starting position.

Although, as described above, there are various embodiments of the present invention, these should be understood such that the different features can be used individually and also in any combination.

Therefore, this invention is not limited just to the particularly preferred embodiments mentioned above.

The invention claimed is:

1. A mounting plate for mounting a lavatory body to a building wall, the mounting plate comprising:
   a rear building wall-facing side;
   a front lavatory body-facing side;
   at least one through opening for passage of a flushing water supply and an outflow;
   holes for receiving rods extending from the building wall for fastening the mounting plate to the building wall;
   first and second plug elements for pluggable mounting of the lavatory body on the front side of the mounting plate, wherein the first plug element is provided on a left half of the front side of the mounting plate, and the second plug element is provided on a right half of the front side of the mounting plate;
   an electrical plug connector provided on the front side of the mounting plate; and
   a water supply connection piece provided on the front side of the mounting plate for supplying water to a container arranged in the lavatory body.

2. The mounting plate according to claim 1, wherein the first plug element and the second plug element each comprise locking means for snap-in engagement with guide elements on the lavatory body when the lavatory body is mounted on the front side of the mounting plate.

3. The mounting plate according to claim 1, wherein the mounting plate further comprises a control element that together with the water supply connection piece forms a water supply for a bidet device contained in the lavatory body.

4. The mounting plate according to claim 1, wherein an electrical main switch for switching on and off of an electrical interface comprising the electrical plug connector is arranged on the front side of the mounting plate.

5. The mounting plate according to claim 4, wherein the electrical interface comprises a mains voltage supply for a shower toilet contained in the lavatory body, and a data interface for data communication with the shower toilet contained in the lavatory body.

6. The mounting plate according to claim 4, wherein the electrical interface comprises at least one connection point for electrical signal transmission.

7. The mounting plate according to claim 6, wherein the at least one connection point comprises a control line for the control element.

8. The mounting plate according to claim 2, wherein:
the locking means comprises spring elements provided on the first and second plug elements, respectively, for snap-in engagement with guide elements provided on the lavatory body; or
the locking means comprises holding elements provided on the first and second plug elements, respectively, for snap-fit engagement with spring elements provided on first guide elements and second guide elements of the lavatory body.

9. The mounting plate according to claim 8, wherein the spring elements are spring cotter pins, and wherein each spring cotter pin is mountable and demountable from the plug element or guide element in a plane substantially parallel to the front side of the mounting plate.

10. The mounting plate according to claim 9, wherein the spring cotter pins comprise two elastically-biased arms which are arranged adjacent to one another in a plane parallel to the front side of the mounting plate.

11. The mounting plate according to claim 1, wherein the mounting plate comprises a connection for an electronic signal transmission to a complementary connection for electronic signal transmission contained in the lavatory body.

12. The mounting plate according to claim 1, wherein the mounting plate comprises a seal arranged on its periphery.

13. The mounting plate according to claim 1, wherein the mounting plate has a thickness that does not exceed 70 mm.

14. The mounting plate according to claim 1, wherein the front side of the mounting plate has an area that does not exceed 140,000 mm$^2$.

15. A sanitary appliance comprising:
a mounting plate according to claim 1; and
a lavatory body comprising
a ceramic body with a building-side rear side, an upper side, and a cavity which is open on the rear side;
two or more horizontally spaced-apart guide elements which are fastened to the ceramic body in the cavity for pluggable connection to supporting elements on the mounting plate; and
a bidet device with an electrical connection, wherein the electrical connection is fixedly arranged on the lavatory body as a plug connector which is accessible from the rear side of the ceramic body.

16. The sanitary appliance according to claim 15, wherein when the lavatory body is mounted on the mounting plate, a spacing remains between the ceramic body and a building wall, and a seal or sealing material is inserted into an intermediate space between the ceramic body and the building wall formed by the spacing.

17. A kit comprising:
a mounting plate according to claim 1; and
a lavatory body comprising
a ceramic body with a building-side rear side, an upper side, and a cavity which is open on the rear side;
two or more horizontally spaced-apart guide elements which are fastened to the ceramic body in the cavity for pluggable connection to supporting elements on the mounting plate; and
a bidet device with an electrical connection, wherein the electrical connection is fixedly arranged on the lavatory body as a plug connector which is accessible from the rear side of the ceramic body.

18. A method for mounting a sanitary appliance that includes
a mounting plate according to claim 8, wherein an electrical main switch for switching on and off of an electrical interface comprising the electrical plug connector, is arranged on the mounting plate; and
a lavatory body comprising
a ceramic body with a building-side rear side, an upper side, and a cavity which is open on the rear side;
two or more horizontally spaced-apart guide elements which are fastened to the ceramic body in the cavity for pluggable connection to supporting elements on the mounting plate; and
a bidet device with an electrical connection, wherein the electrical connection is fixedly arranged on the lavatory body as a plug connector which is accessible from the rear side of the ceramic body, and wherein the guide elements comprise holding elements for a snap-in connection to the first supporting element and the second supporting element on the mounting plate,
the method comprising the steps of:
fastening the mounting plate on the housing wall;
connecting the electrical interface and the water supply to corresponding building-side connections;
fastening the lavatory body on the mounting plate by pushing the guide elements into the first supporting element and the second supporting element until the spring elements snap into the holding elements; and
attaching a seal or a sealing material in an intermediate space formed between the ceramic body and a building wall.

19. A method for removing a lavatory body of a sanitary appliance comprising that has been mounted to a mounting plate fastened to a building wall according to claim 18, the method comprising the steps of:
pulling a cord or wire fastened to the spring elements until the spring elements are disengaged from the supporting elements or guide elements; and
pulling the lavatory body away from the mounting plate.

* * * * *